Sept. 4, 1962 A. M. BISHAY 3,052,637
GLASS COMPOSITION AND PROCESS OF MAKING
Filed June 5, 1961
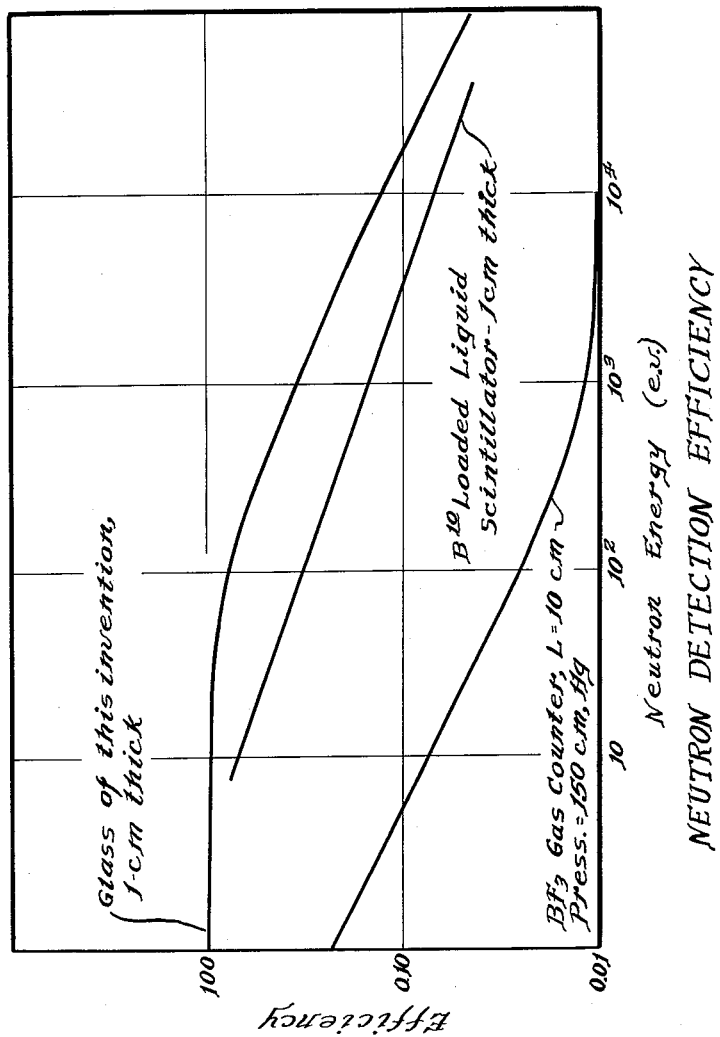
INVENTOR.
Adli M. Bishay
BY
Attorney

United States Patent Office 3,052,637
Patented Sept. 4, 1962

3,052,637
GLASS COMPOSITION AND PROCESS
OF MAKING
Adli M. Bishay, Chicago, Ill., assignor to the United
States of America as represented by the United States
Atomic Energy Commission
Filed June 5, 1961, Ser. No. 115,054
13 Claims. (Cl. 252—301.4)

This invention deals with a novel vitreous composition and with a process of making it. The composition of this invention is primarily intended as a glass scintillator to be used in scintillation counters for measuring neutrons of thermal energies, namely energies of between $10^2$ and $10^4$ e.v.

In scintillation counters the neutrons are captured by an element of comparatively high neutron-capture cross section, such as boron; boron, by the capture of the neutrons, releases alpha particles. Cerium or another alpha-excitable element has to be present in this type of scintillator so that under the effect of alpha particles photons are emitted which can then be detected by a photomultiplier. Scintillation counters are described, among others, in Neucleonics, volume 18, No. 5 (May 1960), pp. 85 ff.

The requirements for a good scintillator are: the pulse height has to be so large that it can be separated from the background noise of the photomultiplier; the pulse height distribution should be reasonably narrow so that discrimination against other kinds of radiation is possible; the scintillator should have a high efficiency, which means it should have a high neutron-capture cross section; it should have a fast response; and it should have a large surface area.

It is an object of this invention to provide a glass composition that has the above-listed properties and in particular has an especially high neutron-capture cross section and thus great efficiency for the detection of neutrons in the energy range of between $10^2$ and $10^4$ e.v.

It is also an object of this invention to provide a vitreous scintillator composition that is homogeneous and clear and has a very high degree of light transmittance.

It has been found that a glass having a high boron content and thus a high neutron-capture cross section and also containing a relatively great proportion of cerous oxide, $Ce_2O_3$, has a higher efficiency as to neutron-counting than any other scintillator known and used heretofore for this purpose.

It was determined during the studies that led to this invention that the higher the boric oxide content in the glass composition the higher a cerous oxide content is necessary to obtain optimum pulse height and that the molar cerium content required to obtain optimum pulse height increases linearly with an increase in the content of boric oxide. Furthermore, it was discovered that the pulse height increases with increasing cerous oxide content to an optimum value depending on the boric oxide content, but that the pulse height then decreases with a further increase of the cerous oxide content. This is shown in Table I, where the maximum pulse height is obtained with a cerous oxide content of about 0.4. The pulse height was expressed in arbitrary units obtained by comparison with a conventional scintillator available.

TABLE I

| Glass No. | Mole Ratio | | | | Pulse Height |
|---|---|---|---|---|---|
| | $Al_2O_3$ | $B_2O_3$ | $Na_2O$ | Ce (as $Ce_2O_3$) | (Arbitrary Units) |
| 1 | 1.0 | 4.5 | 1.0 | 0.195 | 4.6 |
| 2 | 1.0 | 4.5 | 1.0 | 0.260 | 7.0 |
| 3 | 1.1 | 4.5 | 1.0 | 0.330 | 7.4 |
| 4 | 1.2 | 4.5 | 1.0 | 0.369 | 7.5 |
| 5 | 1.2 | 4.5 | 1.0 | 0.402 | 10.7 |
| 6 | 1.2 | 4.5 | 1.0 | 0.503 | 8.1 |

On the other hand, it was found that the maximum pulse height of the boric-oxide- and cerous-oxide-containing glass decreases with increasing boric oxide content. This is shown in Table II.

TABLE II

| Mole percent $B_2O_3$ | Mole percent Ce | Optimum Pulse Height |
|---|---|---|
| 54.5 | 3.6 | 17.0 |
| 63.4 | 5.7 | 10.7 |
| 65.9 | 6.5 | 8.8 |
| 68.7 | 7.0 | 8.3 |
| 70.9 | 7.4 | 7.1 |
| 73.5 | 8.1 | 6.7 |

In regard to the fact that an increase in boric oxide results in an increase of the efficiency but a decrease of the pulse height, it was decided that the neutron-capture efficiency was of greater importance in a scintillator than the pulse height as long as the latter was large enough to discriminate from background noise. For this reason a glass composition having a higher boric oxide content is preferred.

All the glasses that have an optimum pulse height of 6.5 units or more are suitable as scintillators, since this is considerably above the background noise of the photomultiplier at room temperature. Also, if necessary, the noise rate can be reduced easily to a negligible level by cooling the photomultiplier.

Finally, it was also found that potassium oxide causes devitrification with a cerium content of above 3 mole percent, that sodium oxide does not have this drawback, and also that lithium oxide as the alkali metal oxide does not result in as great a pulse height as does sodium oxide. For these reasons sodium oxide is the preferred alkali metal oxide. The disadvantageous effect of $Li_2O$ is illustrated in Table III.

TABLE III

| Mole Ratio | | | | Pulse Height (Arbitrary Units) |
|---|---|---|---|---|
| $Al_2O_3$ | $B_2O_3$ | Alkali Metal Oxide | $Ce_2O_3$ | |
| 1.0 | 4.5 | 1.0 $Na_2O$ | 0.195 | 4.6 |
| 1.0 | 4.5 | 1.0 $Li_2O$ | 0.195 | 3.2 |
| 1.1 | 4.5 | 1.0 $Na_2O$ | 0.330 | 7.4 |
| 1.1 | 4.5 | 1.0 $Li_2O$ | 0.330 | 4.5 |

The vitreous composition according to this invention consists of from 70 to 75 mole percent of boric oxide, from 7 to 9 mole percent of cerium in the form of cerous oxide, and from 23 to 16 mole percent of a mixture of aluminum oxide and sodium oxide in a mole ratio of between 1 and 1.5. The higher content of cerous oxide requires the higher content of aluminum oxide within these ranges.

If the cerium is present in the tetravalent state, the glass does not scintillate under the effect of alpha particles. It is only the trivalent cerium that is excited by the alpha particles derived from the neutron capture by the $B^{10}$ in the glass composition.

In preparing the vitreous composition of this invention, the cerium was introduced as cerous oxalate and the boron as ammonium pentaborate; both salts were mixed in the quantities stoichiometrically required to obtain the predetermined composition. Hydrated alumina and sodium carbonate were also added in the amounts needed to yield the desired contents of aluminum and sodium oxides. Melting was carried out in an inert or reducing atmosphere, for instance in an atmosphere of argon, and the melting temperature was maintained at between 1400 and 1500° C. When these directions were followed, the cerium remained completely reduced in the trivalent state in spite of the large amount of boric oxide. However, if the glass is to contain more than 6 mole percent of cerium, which is the case in the glass of this invention, the addition of from 1 to 2% by weight of ammonium tartrate is advantageous to ensure the cerium in the trivalent state.

The glass composition of this invention has a considerably higher neutron-detection efficiency than scintillators known and used heretofore. This is shown in the attached drawing in which the efficiencies of a liquid, $B^{10}$-containing scintillator and of a boron trifluoride counter as they have been used heretofore are compared on a semilogarithmic scale with the efficiency of the glass of this invention for counting neutrons of thermal energies. The glass had the following composition: 11.0 mole percent of $Al_2O_3$; 73.5 mole percent of $B_2O_3$; 7.4 mole percent of $Na_2O$; and 8.1 mole percent of cerium in the form of $Ce_2O_3$. The glass had been prepared by melting corresponding amounts of hydrated alumina, ammonium pentaborate, sodium carbonate and cerous oxalate at 1400° C. in an atmosphere consisting of argon, as will be described in detail in the example.

It will be evident from a study of the diagrams of the drawing that the glass of this invention is radically superior to the other two conventional scintillators. It is well to emphasize that the glasses of this invention are perfectly clear and water-white in spite of the cerium content being higher than in any other glass used heretofore.

In the following the preparation of a typical glass of this invention is described by way of example; this glass produced is the one shown in the drawing as "glass of this invention" and the composition of which is given above.

*Example*

30.7 grams of hydrated alumina, 154 grams of ammonium pentaborate, 15 grams of sodium carbonate and 54.7 grams of cerous oxalate were mixed and heated slowly up to 1400° C. in an atmosphere of argon. These conditions were maintained for about 3 hours, and the reaction mass was then allowed to cool to 1300° C. to refine the glass or remove any bubbles. The glass was then cooled to about 400° C. and then allowed to cool to room temperature within a period of about 16 hours for annealing.

The product obtained was colorless and clear and had the composition given above in connection with the discussion of the drawing. Its light transmittance was over 90% for wave lengths greater than 3800 A.

It will be understood that the invention is not to be limited to the details given herein but that it may be modified within the scope of the appended claims.

What is claimed is:

1. A vitreous composition consisting of from 70 to 75 mole percent of boric oxide, from 7 to 9 mole percent of cerium all in the form of cerous oxide, and from 23 to 16 mole percent of a mixture of aluminum oxide and sodium oxide in a mole ratio of between 1 and 1.5.

2. A glass composition consisting of 54.5 mole percent of boric oxide, 3.6 mole percent of cerium in the form of cerous oxide and 41.9 mole percent of a mixture of aluminum oxide and sodium oxide in a mole ratio of between 1 and 1.5.

3. A glass composition consisting of 63.4 mole percent of boric oxide, 5.7 mole percent of cerium in the form of cerous oxide and 30.9 mole percent of a mixture of aluminum oxide and sodium oxide in a mole ratio of between 1 and 1.5.

4. A glass composition consisting of 65.9 mole percent of boric oxide, 6.5 mole percent of cerium in the form of cerous oxide and 27.6 mole percent of a mixture of aluminum oxide and sodium oxide in a mole ratio of between 1 and 1.5.

5. A glass composition consisting of 68.7 mole percent of boric oxide, 7.0 mole percent of cerium in the form of cerous oxide and 24.3 mole percent of a mixture of aluminum oxide and sodium oxide in a mole ratio of between 1 and 1.5.

6. A glass composition consisting of 70.9 mole percent of boric oxide, 7.4 mole percent of cerium in the form of cerous oxide and 21.7 mole percent of a mixture of aluminum oxide and sodium oxide in a mole ratio of between 1 and 1.5.

7. A glass composition consisting of 73.5 mole percent of boric oxide, 8.1 mole percent of cerium in the form of cerous oxide and 18.4 mole percent of a mixture of aluminum oxide and sodium oxide in a mole ratio of between 1 and 1.5.

8. A glass composition consisting of 73.5 mole percent of boric oxide, 8.1 mole percent of cerium in the form of cerous oxide, 11.0 mole percent of aluminum oxide and 7.4 mole percent of sodium oxide.

9. In a scintillation counter, a scintillator consisting of from 70 to 75 mole percent of boric oxide, from 7 to 9 mole percent of cerium all in the form of cerous oxide, and from 23 to 16 mole percent of a mixture of aluminum oxide and sodium oxide in a mole ratio of between 1 and 1.5.

10. The scintillator of claim 9 which consists of 73.5 mole percent of boric oxide, 8.1 mole percent of cerium in the form of cerous oxide, 11.0 mole percent of aluminum oxide and 7.4 mole percent of sodium oxide.

11. A process of making a glass composition comprising melting cerous oxalate, ammonium pentaborate, sodium carbonate and hydrated alumina in a nonoxidizing atmosphere at from 1400 to 1500° C., the four ingredients being mixed in a ratio to yield a product in which boric oxide is present in a quantity of from 70 to 75 mole percent, cerous oxide in a quantity of from 7 to 9 mole percent, the balance being aluminum and sodium oxides in a mole ratio of between 1 and 1.5; and cooling the product obtained to room temperature.

12. The process of claim 11 wherein the nonoxidizing atmosphere is argon.

13. The process of claim 11 wherein melting at from 1400 to 1500° C. is carried out for about three hours and cooling is carried out stepwise by first cooling to about 1300° C. for refining, then to about 400° C. and finally by permitting the product to cool to room temperature within a period of from 12 to 18 hours for annealing.

References Cited in the file of this patent

UNITED STATES PATENTS

| | | |
|---|---|---|
| 2,284,055 | Huniger et al. | May 26, 1942 |
| 2,393,469 | Hooley | Jan. 22, 1946 |
| 2,805,166 | Loffler | Sept. 3, 1957 |
| 2,938,808 | Duncan et al. | May 31, 1960 |
| 3,032,428 | Ginther | May 1, 1962 |